May 8, 1934.　　C. A. McDOWELL ET AL　　1,958,059
METAL TRIMMING MECHANISM
Filed July 22, 1932
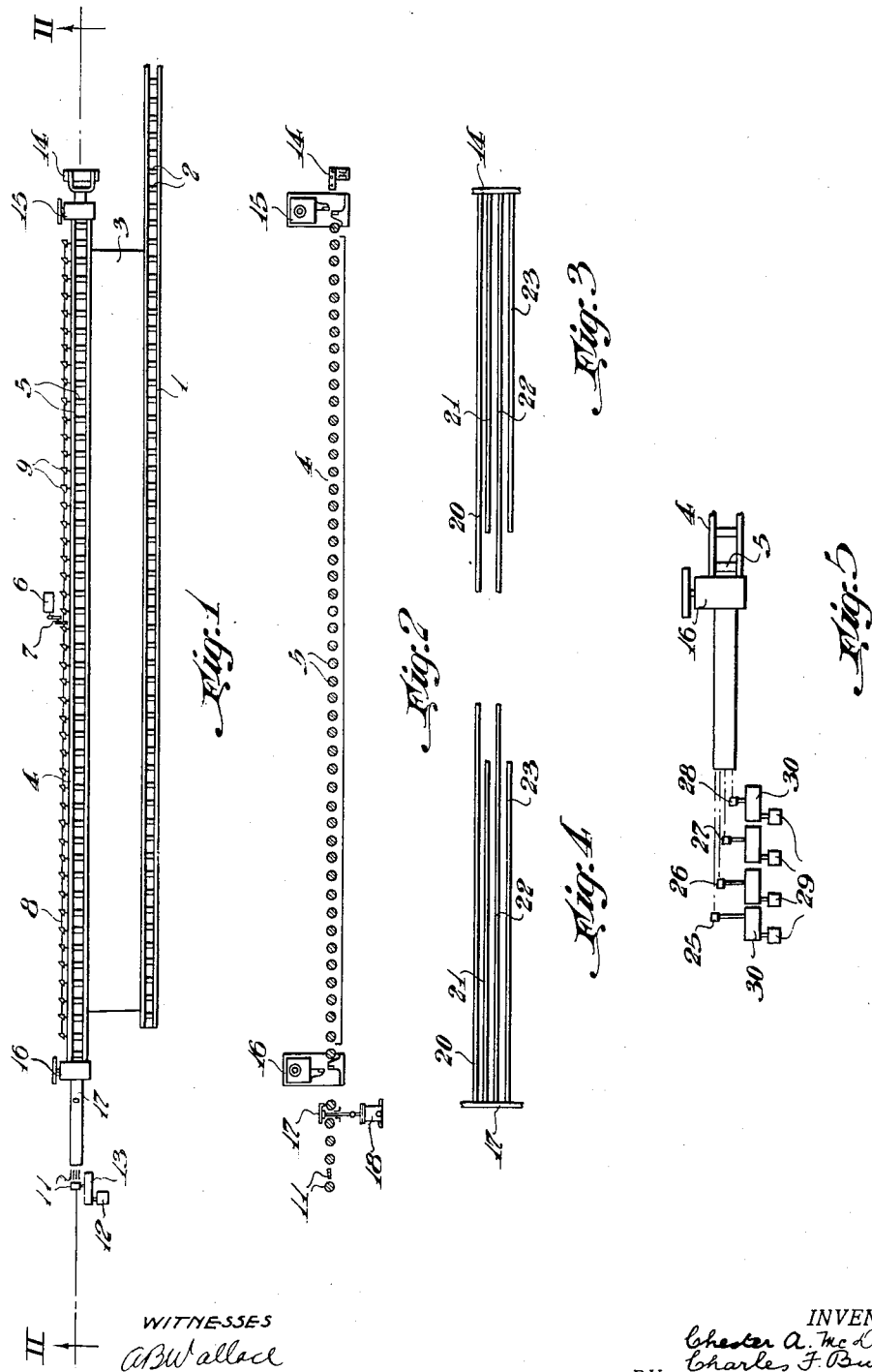
WITNESSES
A B Wallace
E O Johns
INVENTORS
Chester A. McDowell
Charles F. Buente
BY Brown, Critchlow & Flick
ATTORNEYS Patented May 8, 1934

1,958,059

UNITED STATES PATENT OFFICE 1,958,059

METAL TRIMMING MECHANISM

Chester A. McDowell and Charles F. Buente, Pittsburgh, Pa., assignors to United Engineering & Foundry Company, Pittsburgh, Pa., a corporation of Pennsylvania Application July 22, 1932, Serial No. 624,016

8 Claims. (Cl. 164—49)

Our invention relates to apparatus for and methods of cropping metal rods or bars, and particularly to the cropping or shearing of rods or bars of various shapes and such as may be suitable for the manufacture of hexagonal or square nuts or other articles.

It is an object of our invention to provide an arrangement for cropping rods and bars in such manner that waste of material is reduced to a minimum.

In the preparation of metal rods or bars, and particularly when the material is to be used for the manufacture of hexagonal or square nuts or similar articles, it is desirable to shear or crop the ends of the rods or bars in order to insure the removal of any imperfect material such as the tapering ends resulting from rolling. In the ordinary or usual operations for shearing a plurality of rods simultaneously the rods are sheared at their ends without particular regard to variations in lengths of the rods or to the length of material that is removed therefrom. The amount of material that becomes waste or is scrapped is therefore considerable.

In accordance with the present invention, we provide a method of operation, and apparatus for such method, wherein the amount of material that is removed from the end of each rod is reduced to minimum requirements and the total amount of material that is scrapped is therefore a minimum.

The details of our invention will be described in connection with the accompanying drawing, in which Fig. 1 is a plan view of apparatus constructed in accordance with our invention; Fig. 2 a vertical sectional view of the apparatus taken on line II—II of Fig. 1; Fig. 3 a plan view of the relative positions of a plurality of rods in readiness for shearing at their remote ends; Fig. 4 a similar view of the rods of Fig. 3 arranged for shearing at their forward ends; and Fig. 5 an enlarged plan view of a portion of a modified arrangement of the apparatus of Fig. 1.

Referring particularly to Figs. 1 and 2, hot steel rods or bars which may be of square or hexagonal shape as desired are removed from a rolling mill by any suitable means such as a run-out table or hot run table 1 which consists of a number of spaced transverse rollers 2 for conveying the rods or bars longitudinally. At one side of the run-out table 1 is a cooling bed 3 to which the hot bars or rods may be transferred by any suitable or usual means, not shown, for cooling.

At the opposite side of the cooling bed 3 is a cold run table 4 which is in the form of a reversible conveyor comprising a series of transverse rollers 5 that are operated by means of a driving motor 6 geared thereto by a reduction gear mechanism 7 and a shaft 8 having bevel gear connections 9 to each of the rollers 5.

The reversible conveyor of the cold run table 4 is in alignment with a winding reel 11 which may be, for example, a multiple winding reel that is adapted for coiling a plurality of rods simultaneously. The reel is driven by an electric motor 12 that is connected thereto by reduction gear mechanism indicated at 13. At the end of the reversible conveyor 4 that is remote from the winding reel 11 is a stationary stop 14 and a cropping shear 15 that is spaced from the stop 14 to shear a desired amount of material from rods or bars on the conveyor.

At the forward end of the conveyor 4 is a second cropping shear 16 that is located adjacent a disappearing stop 17. The latter is provided with a cylinder 18 operated by fluid pressure to control the vertical position of the disappearing stop. When the latter is in its lowermost position, rods or bars may be actuated along the conveyor to the winding reel 11 without interference by the stop. The stop is operated only when it is desired to shear or trim the forward ends of the rods or bars to be coiled.

In the operation of the apparatus shown in Figs. 1 and 2, hot rods or bars of approximately suitable length for coiling are supplied to the hot run table 1 and are then transferred laterally to the cooling bed 3. The cooled rods are then transferred to the reversible conveyor 4 and are conveyed to the stationary stop 14 with their remote ends in alignment as shown in Fig. 3. Four rods 20, 21, 22 and 23 are shown by way of example. It will be understood that the number of rods will correspond to the number of spaces for coils on the winding reel 11. The cropping shear 15 is then operated to shear a predetermined amount of material from the end of each of the rods.

The motor 6 is then operated to reverse the conveyor and to align the rods 20 to 23 against the disappearing stop 17, the rods then having the relative positions shown in Fig. 4. It will be noted that the rods 20 and 22, for example, are longer than the rods 21 and 23 but that when they are aligned against the stop 17 they are in position for shearing an equal amount of material from each of the rods. The shear 16 then operates to trim the forward ends of the several rods.

The disappearing stop 17 is allowed to fall to its lowermost position and the conveyor is then operated to supply the rods to the multiple winding reel 11 for coiling. It may be noted that differences in lengths of the rods within reasonable limits will not affect the successful operation of the reel 11 as each coil is formed independently of the other.

When the rods are supplied to the winding reel 11, the conveyor 4 is then available for another supply of rods and these may be operated upon while the reel is winding the preceding group of rods.

A multiple winding reel has been illustrated in connection with the apparatus of Figs. 1 and 2 but our improved apparatus is not limited to reels of this type. For example, as shown in Fig. 5, there may be substituted for the multiple winding reel a series of four individual reels for receiving the respective rods for coiling. The individual reels 25, 26, 27 and 28 are each operated by an electric motor 29 and suitable gear mechanism 30. The modified arrangement is otherwise identical with that of Figs. 1 and 2.

It will be noted that we have provided an arrangement whereby a desired minimum amount of material may be sheared from the ends of rods or bars of varying lengths and, accordingly, the amount of material that is scrapped may be limited as desired.

While we have shown and described our invention in connection with apparatus for coiling the cropped rods or bars, it will be obvious that our invention is equally applicable to rods or bars of various shapes that may be shipped, after cropping, in bundles or in bulk. Our invention is not to be limited other than is expressed in the claims.

The foregoing and other advantages will be apparent to those skilled in the art relating to the cropping of metal rods or bars in shapes for manufacturing purposes.

We claim as our invention:

1. Apparatus for cropping metal rods or bars comprising reversible means for conveying said rods longitudinally for successively aligning the respective ends of said rods, and shears for removing predetermined end portions of each of said rods in each of their aligned positions.

2. The method of cropping metal rods or bars for coiling which comprises arranging a plurality of rods substantially in parallel upon a conveyor, aligning corresponding ends of said rods, shearing a predetermined portion therefrom, aligning the other ends of said rods, and then shearing a predetermined portion therefrom.

3. Apparatus for cropping metal bars for coiling comprising a reversible conveying device for conveying the bars longitudinally, a shear for removing a predetermined portion from one end of each of the bars, and a shear for removing a predetermined portion from the other end of each of the bars.

4. The method of cropping metal bars which comprises placing them substantially parallel to each other, and then reversibly conveying them successively to a shear for removing a predetermined portion of one end of each of said bars and to a second shear for removing a predetermined portion from the other end of each of said bars.

5. Apparatus for cropping metal bars of varying lengths comprising a reversible conveying device for conveying bars longitudinally thereon, a shear for removing a predetermined portion from one end of each of said bars while the latter are in endwise alignment, and a shear for removing a predetermined portion from the opposite end of each of said bars while the latter ends are in alignment.

6. The method of cropping metal bars of varying lengths which comprises conveying said bars longitudinally thereon to place corresponding ends thereof in alignment, removing predetermined portions therefrom, conveying said bars to place their opposite ends in alignment, and then removing predetermined portions therefrom.

7. In combination, means for receiving metal bars, a reversible conveyor for conveying a plurality of bars in alignment with the receiving means, a cropping shear at the farther end of said conveyor for trimming equal portions from the farther ends of said bars and a cropping shear adjacent said receiving means for trimming equal portions from the forward ends of said bars, whereby said bars may be of varying lengths without increasing the waste of the material thereof.

8. In combination, a device for receiving metal bars, a hot run table for receiving hot metal rods or bars, a cooling bed for receiving said rods from the hot run table, a conveyor for said bars in alignment with said receiving device to successively align their remote ends for shearing, align their forward ends for shearing and supply them to said receiving device.

CHESTER A. McDOWELL.
CHARLES F. BUENTE.